(12) United States Patent
Rosen (10) Patent No.: US 8,830,854 B2
(45) Date of Patent: Sep. 9, 2014

(54) SYSTEM AND METHOD FOR MANAGING PARALLEL PROCESSING OF NETWORK PACKETS IN A WIRELESS ACCESS DEVICE

(75) Inventor: David B. Rosen, Woodland Hills, CA (US)

(73) Assignee: Xirrus, Inc., Thousand Oaks, CA (US)

( * ) Notice: Subject to any disclaimer, the term of this patent is extended or adjusted under 35 U.S.C. 154(b) by 446 days.

(21) Appl. No.: 13/331,367

(22) Filed: Dec. 20, 2011

(65) Prior Publication Data

US 2013/0028181 A1 Jan. 31, 2013

Related U.S. Application Data

(60) Provisional application No. 61/512,689, filed on Jul. 28, 2011.

(51) Int. Cl.
*H04L 12/26* (2006.01)
(52) U.S. Cl.
USPC .......................... 370/252; 370/395.4; 370/463
(58) Field of Classification Search
None
See application file for complete search history.

(56) References Cited

U.S. PATENT DOCUMENTS

| | | | |
|---|---|---|---|
| 4,042,935 A | 8/1977 | Ajioka et al. | |
| 4,649,391 A | 3/1987 | Tsuda et al. | |
| 4,726,050 A | 2/1988 | Menich et al. | |
| 5,389,941 A | 2/1995 | Yu | |
| 5,592,480 A * | 1/1997 | Carney et al. | 370/347 |
| 5,952,983 A | 9/1999 | Dearnley et al. | |
| 6,140,972 A | 10/2000 | Johnston et al. | |
| 6,157,811 A | 12/2000 | Dent | |
| 6,161,024 A * | 12/2000 | Komara | 455/562.1 |
| 6,326,926 B1 | 12/2001 | Shoobridge et al. | |
| 6,329,954 B1 | 12/2001 | Fuchs et al. | |
| 6,370,386 B1 * | 4/2002 | Williams | 455/452.1 |
| 6,374,078 B1 | 4/2002 | Williams et al. | |
| 6,452,565 B1 | 9/2002 | Kingsley et al. | |
| 6,539,204 B1 | 3/2003 | Marsh et al. | |
| 6,544,173 B2 | 4/2003 | West et al. | |
| 6,606,059 B1 | 8/2003 | Barabash | |
| 6,646,611 B2 | 11/2003 | Plet et al. | |
| 6,888,504 B2 | 5/2005 | Chiang et al. | |
| 6,903,703 B2 | 6/2005 | Durham et al. | |
| 6,933,909 B2 | 8/2005 | Theobold | |
| 7,057,566 B2 | 6/2006 | Theobold | |
| 7,103,386 B2 | 9/2006 | Hoffmann et al. | |
| 7,119,744 B2 | 10/2006 | Theobold et al. | |
| 7,193,562 B2 | 3/2007 | Shtrom et al. | |
| 7,202,824 B1 | 4/2007 | Sanelli et al. | |
| 7,253,783 B2 | 8/2007 | Chiang et al. | |
| 7,274,944 B2 | 9/2007 | Lastinger et al. | |

(Continued)

*Primary Examiner* — Alex Skripnikov
(74) *Attorney, Agent, or Firm* — Francisco A. Rubio-Campos; The Eclipse Group, LLP (57) ABSTRACT

A system for managing parallel processing of network packets is also provided. A wireless access device that includes multiple transceivers and multiple processing units receives network packets. A media access controller determines which transceiver a received network packet is associated with. A tagging module determines whether the transceiver associated with the received network packet is bound to one of the processing units. In response to a determination that the transceiver is bound, a scheduler assigns the received packet to the processing unit the transceiver is bound to. In response to a determination that the transceiver is not bound, the tagging module binds the transceiver to a processing unit such that the processing unit processes network packets associated with the transceiver while the transceiver is bound to the processing unit, and the scheduler assigns the received network packet to the processing unit the transceiver is bound to.

36 Claims, 4 Drawing Sheets

(56) References Cited

U.S. PATENT DOCUMENTS

| | | |
|---|---|---|
| 7,292,198 B2 | 11/2007 | Shtrom et al. |
| 7,358,912 B1 | 4/2008 | Kish et al. |
| 7,362,280 B2 | 4/2008 | Kish et al. |
| 7,496,070 B2 | 2/2009 | Vesuna |
| 7,498,996 B2 | 3/2009 | Kish et al. |
| 7,498,999 B2 | 3/2009 | Shtrom |
| 7,505,447 B2 | 3/2009 | Kish et al. |
| 7,511,680 B2 | 3/2009 | Kish et al. |
| 7,525,486 B2 | 4/2009 | Shtrom et al. |
| 7,567,213 B2 | 7/2009 | Liu |
| 7,646,343 B2 | 1/2010 | Shtrom et al. |
| 7,652,632 B2 | 1/2010 | Shtrom |
| 7,675,474 B2 | 3/2010 | Shtrom et al. |
| 7,696,946 B2 | 4/2010 | Shtrom |
| 7,787,436 B2 | 8/2010 | Kish et al. |
| 7,864,119 B2 | 1/2011 | Shtrom et al. |
| 8,078,194 B2 | 12/2011 | Walley et al. |
| 8,239,599 B1 * | 8/2012 | Bilodeau .................. 710/263 |
| 2001/0033600 A1 | 10/2001 | Yang et al. |
| 2002/0039082 A1 | 4/2002 | Fox et al. |
| 2002/0163933 A1 | 11/2002 | Benveniste |
| 2002/0186678 A1 | 12/2002 | Averbuch et al. |
| 2003/0040319 A1 | 2/2003 | Hansen et al. |
| 2003/0210193 A1 | 11/2003 | Rossman et al. |
| 2004/0001429 A1 | 1/2004 | Ma et al. |
| 2004/0005227 A1 | 1/2004 | Cremer et al. |
| 2004/0052227 A1 | 3/2004 | Judd et al. |
| 2004/0066326 A1 | 4/2004 | Knapp |
| 2004/0102222 A1 | 5/2004 | Skafidas et al. |
| 2004/0105412 A1 | 6/2004 | He et al. |
| 2004/0143681 A1 | 7/2004 | Benveniste |
| 2004/0157551 A1 | 8/2004 | Gainey et al. |
| 2004/0196813 A1 | 10/2004 | Ofek et al. |
| 2004/0203347 A1 | 10/2004 | Nguyen |
| 2004/0224637 A1 | 11/2004 | Silva et al. |
| 2004/0240424 A1 | 12/2004 | Fong et al. |
| 2004/0242274 A1 | 12/2004 | Corbett et al. |
| 2004/0259558 A1 | 12/2004 | Shafidas et al. |
| 2004/0259563 A1 | 12/2004 | Morton et al. |
| 2005/0020299 A1 | 1/2005 | Malone et al. |
| 2005/0025254 A1 | 2/2005 | Awad et al. |
| 2005/0035919 A1 | 2/2005 | Yang et al. |
| 2005/0058097 A1 | 3/2005 | Kang et al. |
| 2005/0058111 A1 | 3/2005 | Hung et al. |
| 2005/0117546 A1 * | 6/2005 | Lioy et al. .................. 370/332 |
| 2005/0237258 A1 | 10/2005 | Abramov et al. |
| 2005/0254470 A1 | 11/2005 | Yashar |
| 2005/0255892 A1 | 11/2005 | Wong et al. |
| 2006/0038738 A1 | 2/2006 | Shtrom |
| 2006/0098616 A1 | 5/2006 | Kish et al. |
| 2006/0109799 A1 | 5/2006 | Tseng et al. |
| 2006/0233280 A1 | 10/2006 | Tynderfeldt et al. |
| 2007/0066234 A1 | 3/2007 | Lastinger et al. |
| 2007/0178927 A1 | 8/2007 | Fernandez-Corbaton et al. |
| 2007/0210974 A1 | 9/2007 | Chiang |
| 2007/0293178 A1 | 12/2007 | Milton et al. |
| 2008/0136715 A1 | 6/2008 | Shtrom et al. |
| 2008/0137681 A1 | 6/2008 | Kish et al. |
| 2008/0221918 A1 | 9/2008 | Petersen et al. |
| 2008/0225814 A1 | 9/2008 | Thermond et al. |
| 2008/0267151 A1 | 10/2008 | Hartenstein |
| 2008/0268778 A1 | 10/2008 | De La Garrigue et al. |
| 2008/0274748 A1 | 11/2008 | Lastinger et al. |
| 2008/0291098 A1 | 11/2008 | Kish et al. |
| 2009/0028095 A1 | 1/2009 | Kish et al. |
| 2009/0075606 A1 | 3/2009 | Shtrom et al. |
| 2010/0053010 A1 | 3/2010 | Shtrom et al. |
| 2010/0053023 A1 | 3/2010 | Shtrom et al. |
| 2010/0103065 A1 | 4/2010 | Shtrom et al. |
| 2010/0103066 A1 | 4/2010 | Shtrom et al. |
| 2010/0119002 A1 | 5/2010 | Hartenstin |
| 2011/0090878 A1 * | 4/2011 | Seibert et al. .................. 370/338 |

* cited by examiner

| Packet | Tag Value | Processing Unit Number |
|---|---|---|
| A3 | T1 | P2 |
| B2 | T1 | P2 |
| — | T3 | P3 |

FIG. 3B

| Processing Unit Number | Transceiver Number |
|---|---|
| P1 | — |
| P2 | T1 |
| P3 | T3 |

FIG. 4B

| Packet | Tag Value | Processing Unit Number |
|---|---|---|
| A1 | T1 | P1 |
| A2 | T1 | P1 |
| B1 | T1 | P1 |
| C1 | T2 | P3 |
| C2 | T2 | P3 |
| — | T3 | P3 |

FIG. 3A

| Processing Unit Number | Transceiver Number |
|---|---|
| P1 | T1 |
| P2 | — |
| P3 | T2, T3 |

SYSTEM AND METHOD FOR MANAGING PARALLEL PROCESSING OF NETWORK PACKETS IN A WIRELESS ACCESS DEVICE

CROSS-REFERENCE TO RELATED APPLICATION

This application claims priority of U.S. Provisional Patent Application No. 61/512,689 titled MAXIMIZING PARALLEL PROCESSING IN A WIRELESS ARRAY, filed on Jul. 28, 2011, which is incorporated by reference in its entirety in this application.

BACKGROUND

When processing packets transmitted over a network it may be advantageous to maximize parallel processing by processing packets simultaneously at multiple processing units, also known as cores. To protect the integrity of shared data structures, it may be necessary to serialize the processing of packets, as well as other accesses, to or from the same transceivers. In a wireless access device having multiple transceivers and multiple processing units, for example, serial access to each transceiver may be necessary to ensure that separate processing units do not simultaneously access the shared data structures for that transceiver. Serializing packet processing for a conversational flow may also be necessary to maintain the sequential ordering of the packets that conversational flow. Maximum parallelism may be achieved by respectively processing multiple conversational flows at multiple processing units simultaneously in parallel. Conversational flow, as used herein, refers to the stream of ordered packets exchanged between two endpoints, possibly via one or more intermediary devices, in a wired or wireless packet-based network.

Many solutions exist to maximize parallel processing of packets transmitted over a wired network, e.g., an Ethernet network using the IEEE 802.3 standard (Institute of Electrical and Electronics Engineers). Hardware accelerators distribute packets to as many processing units as possible and schedules processing of the packets to ensure the serial processing of packets from the same conversational flows and schedule processing of the packets in a manner that maintains the packet order.

These hardware accelerators, however, may be designed to work closely with Ethernet adapters and may be designed to process Ethernet packets in particular. As a result, the hardware accelerators are seemingly incompatible with packets transmitted over a wireless network that uses a wireless protocol, e.g., the IEEE 802.11 standard. Further, due to the nature of wireless packet processing (e.g., various encoding and encryption schemes, continually changing standards, etc.) hardware solutions for accelerating the processing of wireless packets are lacking.

Thus, there is a need to accelerate the processing of wireless packets and maximize parallelism in a wireless interface having multiple processing units.

SUMMARY

A method of managing parallel processing of network packets is provided. A wireless access device that includes multiple transceivers and multiple processing units receives network packets. The transceiver associated with a received network packet is determined. Whether the transceiver associated with the received network packet is bound to one of the processing units is also determined. In response to a determination that the transceiver is bound, the received network packet is assigned to the processing unit the transceiver is bound to. In response to a determination that the transceiver is not bound, the transceiver is bound to a processing unit such that the processing unit processes network packets associated with the transceiver while the transceiver is bound to the processing unit, and the received network packet is assigned to the processing unit the transceiver is bound to.

A system for managing parallel processing of network packets is also provided. A wireless access device that includes multiple transceivers and multiple processing units receives network packets. A media access controller determines which transceiver a received network packet is associated with. A tagging module determines whether the transceiver associated with the received network packet is bound to one of the processing units. In response to a determination that the transceiver is bound, a scheduler assigns the received packet to the processing unit the transceiver is bound to. In response to a determination that the transceiver is not bound, the tagging module binds the transceiver to a processing unit such that the processing unit processes network packets associated with the transceiver while the transceiver is bound to the processing unit, and the scheduler assigns the received network packet to the processing unit the transceiver is bound to.

A method of managing parallel processing of events occurring at a wireless access device is also provided. The wireless access device includes multiple transceivers and multiple processing units. The transceiver an event is associated with is determined. Whether the transceiver associated with the event is bound to one of the processing units is also determined. In response to a determination that the transceiver is bound, the event is assigned to the processing unit the transceiver is bound to. In response to a determination that the transceiver is not bound, the transceiver is bound to one of the processing units, and the event is assigned to the processing unit the transceiver is bound to.

DETAILED DESCRIPTION

A wireless array is a wireless access device having multiple transceivers. Wireless arrays may include, for example, four, eight, twelve, or sixteen wireless transceivers. Each transceiver of the wireless array may operate on a different channel. The transceivers of the wireless array may be used to provide clients with wireless access to a network by exchanging wireless communications with the clients. The wireless access device may be described as being in signal communication with the client.

Additional information about wireless arrays may be found, for example, in U.S. Patent Application Publication No. US 2008/0267151 A1 (U.S. patent application Ser. No. 11/816,064), entitled "Wireless Local Area Network Antenna Array," filed Apr. 3, 2008 and in U.S. Patent Application Publication No. US 2009/0022114 A1 (U.S. patent application Ser. No. 11/816,003), entitled "Access Point in a Wireless LAN," filed Sep. 22, 2006 both assigned to the same assignee as the present patent application. Furthermore, the entire disclosure of these patent application publications is hereby incorporated by reference.

Figure 1:
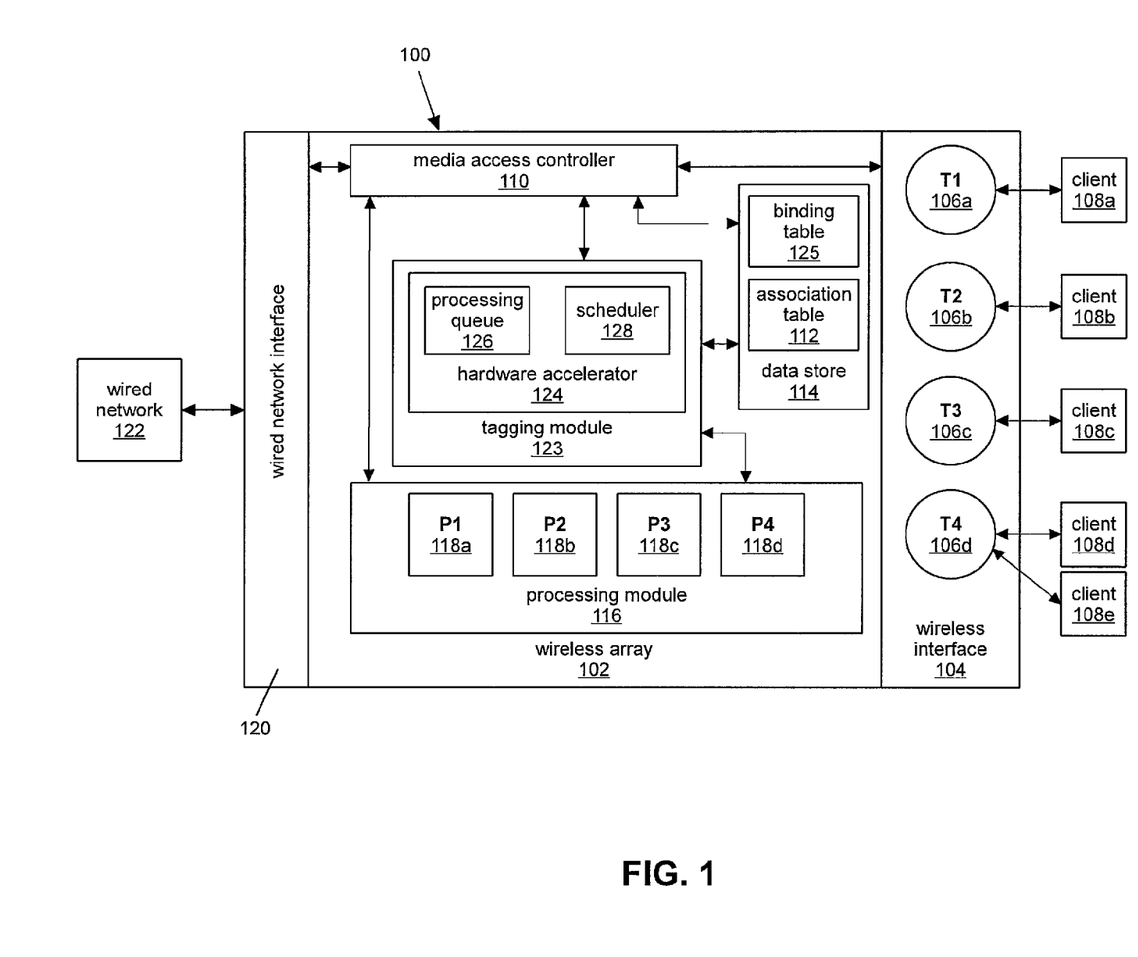
FIG. 1 is an example of an implementation of a system for maximizing parallel processing in a wireless array.

With reference to FIG. 1, an example of an implementation of a system 100 for maximizing parallel processing in a wireless array 102 is shown. The wireless array 102, in this example, includes a wireless interface 104 having four transceivers 106a, 106b, 106c, and 106d (T1-T4). The transceivers 106 of the wireless array 102 may be, for example, radios for exchanging wireless communications with a client 108a, 108b, 108c, 108d, 108e. A client may be in signal communication with a particular transceiver, and transceivers may be in signal communication with multiple clients concurrently as illustrated by way of example in FIG. 1. As seen in FIG. 1, client 108a is in signal communication with transceiver 106a; client 108b is in signal communication with transceiver 106b; client 108c with transceiver 106c; and client 108d and client 108e are in signal communication with transceiver 106d. The transceivers 106 are also in signal communication with a media access controller 110 (MAC), which manages the communications between the transceivers and the clients 108 in signal communication with the wireless array 102.

A client 108 in signal communication with the wireless array 102 refers to a client that exchanges communication signals with the wireless array or simply transmits communication signals to the wireless array. A client 108 in signal communication with the wireless array 102 transmits communication signals within range of a wireless array such that the wireless array can hear (e.g., receive the broadcast from) the client. A client 108 that is in signal communication with a wireless array 102 is connected to the wireless array if the client has been authenticated via, for example, a password. A client 108 may be in signal communication with the wireless array 102 but not connected to the wireless array if the client has not been authenticated. A client 108 in signal communication with but not connected to the wireless array 102 may be referred to as rogue client. Rogue clients may also include other wireless access devices.

When a client 108 connects to the wireless array 102, the client associates with a particular transceiver 106 at the wireless array. Data then flows back and forth between the client 108 and the wireless array 102 on the channel for the transceiver 106 the client is associated with. The wireless array 102 may maintain a global association table 112 at a data store 114 that indicates the particular transceiver 106 a client 108 connected to the wireless array is associated with.

The wireless array 102 may also include a processing module 116 having multiple processing units 118a, 118b, 118c, and 118d (P1-P4) as shown by way of example in FIG. 1. The processing module 116 for a wireless array 102 may include, for example, two, four, or eight processing units 118.

The wireless array 102 may additionally include a wired network interface 120 (e.g., an Ethernet interface) that allows a client 108 to be in signal communication with a wired network 122 (e.g., an Ethernet network). As discussed further below, the wireless array 102 may also maintain a binding table 125 that indicates which processing units 118 are busy and which processing units idle and available to do work (e.g., process packets).

The processing module 116 may perform various types of work in response to events that occur at the wireless array 102. One example of an event is the receipt of a packet at a transceiver 106 or the wired network interface 120. In response to receipt of a packet at the wireless array, the processing module 116 may process the packet. Other examples of events include the generation of an interrupt by a transceiver 106 that requires attention and access of a processing unit 118 to, e.g., configure the transceiver. The processing module 116 may perform work in response to additional or alternative events that occur at the transceiver.

To maximize parallel processing of data packets at the wireless array 102, the wireless array also includes a tagging module 123. As discussed further below, the tagging module 123 tags received packets with a tag value such that packets with the same tag value are processed by the same processing unit. The tagging module 123 may include a hardware accelerator 124 as shown by way of example in FIG. 1. The hardware accelerator 124, in this example, includes: a processing queue 126 that contains work entries to process; and a scheduler 128 that assigns packets to processing units 118 for processing. The hardware accelerator 124, in the example shown, is configured to maximize parallel processing of both packets received from both the wired network interface 120 and the wireless interface 104.

A hardware accelerator 124 suitable to maximize parallel processing in the wireless array 102 may be available from Cavium, Inc. of San Jose, Calif., as part of the OCTEON™ family of Multi-Core MIPS64 processors including, but not limited to the CN38XX/CN36XX family of Multi-Core MIPS64 Based SoC Processors as model numbers CN3630, CN3830, CN3840, CN3850, and CN3860. Furthermore, an implementation that uses a hardware accelerator 124 from Cavium, Inc. may set the tag type for the work entry in the processing queue 126 to "ATOMIC" in order to serialize processing of packets, or other events, associated with the same tag value.

The system 100, in this example, maximizes parallel processing of network packets by dynamically binding one or more transceivers 106 to one of the processing units 118 in the processing module 116. Binding a transceiver 106 to a processing unit 118 assigns that transceiver to the processing unit such that the processing unit processes packets associated with the transceiver while the processing unit is assigned to the transceiver. When a transceiver 106 is bound to a processing unit 118, no other processing unit will process packets associated with the assigned transceiver 106. In other words, when a transceiver 106 is bound to a processing unit 118, no other processing unit will process packets that originate from or are destined to that transceiver. Because a conversational flow, in this example, occurs over the same transceiver 106, binding the transceiver to a processing unit 118 ensures that packets associated with the conversational flow are processed sequentially. In this way, the system 100 serializes the processing of packets in the same conversational flow. Binding a transceiver 106 to a particular processing unit 118 also ensures that multiple processing units do not simultaneously access the same transceiver or data structures associated with the same transceiver. Note that the binding of transceivers to processing units is many-to-one: many transceivers may be bound to a single processing unit. Once a transceiver is bound to a processing unit, however, no other processing unit will process packets associated with the bound transceiver. Accordingly the system 100 advantageously reduces the need for locking and synchronization thereby improving parallel processing of the packets.

Once the processing unit 118 has processed the received packets associated with a particular transceiver 106, the system 100 determines if there are any outstanding events associated with the transceiver. If there are outstanding events associated with the transceiver 106 remain, then the system 100 maintains the binding of the transceiver to the processing unit 118 until the outstanding events are processed. If there are no outstanding events associated with the transceiver 106, then the system 100 unbinds the transceiver from the processing unit. Once unbound from the processing unit 118, the transceiver 106 is free to be subsequently bound and assigned to another processing unit in response to the occurrence of events associated with that transceiver. In this way, the system 100 ensures that the packets are processed sequentially while advantageously allowing any processing unit 118 to process events associated with a particular transceiver if there are no events associated with that transceiver currently being processed or queued for processing by another processing unit.

To maximize parallel processing, the system 100 groups together communications associated with a particular transceiver 106. If multiple endpoints are associated with a particular transceiver 106, for example, then the system 100 groups together the communications between that transceiver 106 and those endpoints for processing packets associated with those endpoints. In this example, the tagging module 123 tags received packets with a unique identifier. The tagging module 123, in this example, tags packets associated with the same transceiver with the same unique identifier, i.e., tag value. Note that packets from different conversational flows may be associated with the same transceiver 106 if the respective endpoints for those conversational flows are each associated with that transceiver. In effect the tagging module 123 tags packets associated with the same transceiver with the same unique identifier. As discussed further below, the hardware accelerator 124 may be configured to determine a unique identifier for a received packet and tag the received packet with the unique identifier. Alternatively, the tagging module may include a software module (not shown) that determines the unique identifier for the received packet and tags the received packet with the unique identifier.

In some example implementations, the unique identifier may be a 5-tuple that combines: the source port number; the source IP address (Internet Protocol); the destination port number; the destination IP address; and a protocol identifier, which may be hashed to a tag value. The hardware accelerator 124 may set the hashed tag value as the unique identifier for the received packet. Alternatively, as shown in this example, the unique identifier may be information identifying the transceiver 106 associated with the packet. For example, the information identifying the transceiver 106 associated with the packet may be the transceiver number. The hardware accelerator 124, in this example, includes a tagging component (not shown) that may be referred to as the packet input processor (PIP), and the tagging module 123 may use the tagging component of the hardware accelerator to tag received packets with the unique identifier. The PIP may compute the 5-tuple hash, insert the tag value into a work entry, and insert the work entry into the work queue. Additionally or alternatively the tagging module 123 may include a software module (not shown) that inserts a tag value based on a transceiver number into a work entry and inserts the work entry into the work queue. It will be understood that the PIP may be configured to insert a tag value based on a transceiver number as well.

Once the packets are tagged, the hardware accelerator 124 may add a respective work entry to the processing queue 126 for each packet to be processed. Work entries in the processing queue 126 may include or be associated with the respective tag values for the packets to be processed. A work entry in the processing queue 126 may also indicate which transceiver 106 the packet is associated with. The media access controller 110 may determine which transceiver 106 the packet is associated with based on, for example, the origin or destination of the packet. When a packet is received at the wired network interface 120, for example, the media access controller may perform a lookup in the association table 112 to determine which transceiver 106 the packet is associated with based on the destination of the packet, and the transceiver number (e.g., T1, T2, T3, T4, etc.) may be included in or associated with the processing queue work entry for the packet to be processed.

As mentioned above, the processing module 116 may perform work in response to various types of events that occur at the wireless array, e.g., transceiver interrupts, transceiver configurations, etc. Accordingly the hardware accelerator may also add entries to the processing queue 126 associated with these events as the events occur. Events may include, for example, receipt of a packet at a transceiver 106 of the wireless array 102, i.e., a received network packet event; configuration of the transceiver, i.e., a transceiver configuration event; and maintenance of the transceiver, i.e., a transceiver maintenance event. In order to maximize parallel processing of responses to these events, the system 100 may bind a transceiver 106 to a processing unit 118 while the processing unit processes a response to the event.

When a work entry in the processing queue 126 reaches the front of the processing queue, the system 100 processes the packet associated with the work entry. The scheduler 128, in this example, determines which processing unit 118 should process the packet. As mentioned above, the system 100 dynamically assigns packets associated with a particular transceiver 106 to a processing unit 118 for processing. Also mentioned above, the system 100 dynamically binds a transceiver 106 to a particular processing unit 118, which ensures that, while the transceiver is bound to the processing unit, packets from that transceiver are processed by the same processing unit.

When assigning a packet to a processing unit 118, the scheduler 128 may first determine if the transceiver 106 associated with the packet is already bound to a particular processing unit. If the transceiver 106 associated with the packet is currently bound to a particular processing unit 118, the scheduler 128 assigns the packet to that processing unit associated with the transceiver. If the transceiver 106 associated with the packet is not already bound to a particular processing unit 118, the scheduler 128 identifies a processing unit 118 to bind the transceiver 106 to.

In some example implementations, that scheduler 128 may determine if a processing unit is idle (i.e., not currently performing work) and thus available to process the packet. If a processing unit 118 is available to process the packet, the scheduler 128 binds the transceiver 106 to the available processing unit by updating the binding table 125 with information identifying the processing unit the transceiver is bound to. In some example implementations, if a processing unit 118 is not currently available, the scheduler 128 may wait until a processing unit becomes available to bind the transceiver 106 to a processing unit. Additionally or alternatively the scheduler 128 may bind multiple transceivers 106 to a single processing unit 118 as discussed above. The scheduler 128 may, for example, advantageously bind multiple transceivers 106 to a single processing unit 118 where work performed for one transceiver takes a relatively long amount of time but requires minimal intervention from the processing unit thus allowing the processing unit to perform work for another transceiver in the meantime. Furthermore the particular behavior of the scheduler in this manner may be user-configurable.

Once a processing unit 118 performs the work for the work entry, e.g., processing a packet, the hardware accelerator 124 may remove the work entry from the processing queue 126 corresponding to the processed packet. Once all entries in the processing queue 126 for a particular transceiver 106 have been processed, the hardware accelerator 124, in this example, unbinds that transceiver 106 from the processing unit 118 by updating the binding table 125 to indicate the transceiver is available to be subsequently bound to another processing unit. A processing unit 118, in this example, is bound to a particular transceiver 106 as long as the processing queue 126 includes entries corresponding to packets associated with that transceiver. This may be determined, for example, by determining whether the processing queue includes entries that include or are associated with the transceiver number (e.g., T1, T2, T3, T4, etc.) for the transceiver 106.

Figure 2:
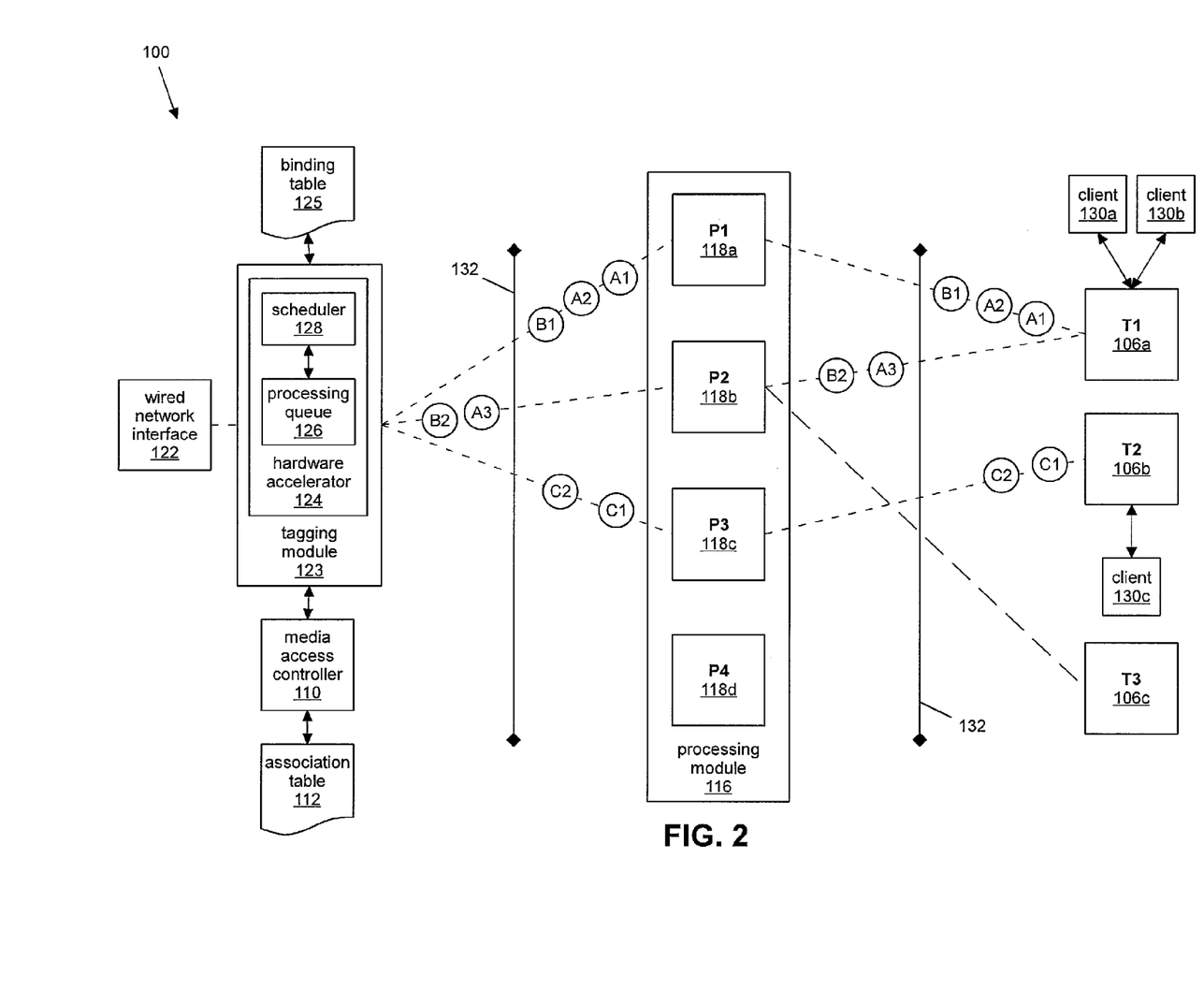
FIG. 2 is a packet flow diagram for an example of an implementation of a system for maximizing parallel processing in a wireless array.

Referring to FIG. 2, a block diagram of packet flow in an example of an implementation of a system 100 for maximizing parallel processing in a wireless array is shown. In this example, FIG. 2 illustrates the flow of packets A1-3, B1-2, and C1-2 through the system 100 from the wired network interface 122 to the transceivers 106. In this example, the system 100 processes packets of three conversational flows from three different clients: a flow from client 130*a* (packets A1, A2, and A3); a flow from client 130*b* (packets B1 and B2); and a flow from client 130*c* (packets C1 and C2). As seen in FIG. 2, client 130*a* and client 130*b* are connected to and associated with transceiver 106*a*, and client 130*c* is connected to and associated with transceiver 106*b*. Accordingly, the system 100 exchanges wireless communications with client 130*a* and client 130*b* via transceiver 106*a*, and the system exchanges wireless communications with client 130*c* via transceiver 106*b*. As seen in FIG. 2, a third transceiver 106*c* is not associated with any conversational flow. The bulleted lines 132 in FIG. 2 represents a break in time between the receipt and processing of packets A1, A2, B1, C1, and C2 and the receipt and processing of packets A3 and B2. In other words, in the packet flow diagram shown in FIG. 2, the system 100 receives and processes packets A1, A2, B1, C1, and C2 before the system receives and processes packets A3 and B2.

As seen in FIG. 2, the system 100 first receives a flow of packets A1, A2, and B2 associated with transceiver T1 and a flow of packets C1 and C2 associated with transceiver T2. In this example, the packets are received at the wired network interface 122. The hardware accelerator 124 may assign a tag value to these packets using, for example, the transceiver number associated with the packets, e.g., T1 or T2. Accordingly, packets A1,A2, and B1 would receive the same unique tag value indicating the packets are associated with transceiver T1, and packets C1 and C2 would receive a unique tag value indicating the packet is associated with transceiver T2.

Figure 3A:
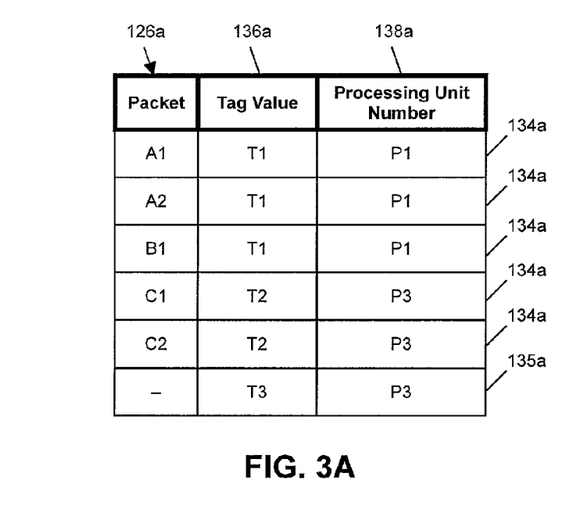
FIG. 3A is a representation of a processing queue in a first stage of operation.
Figure 4A:
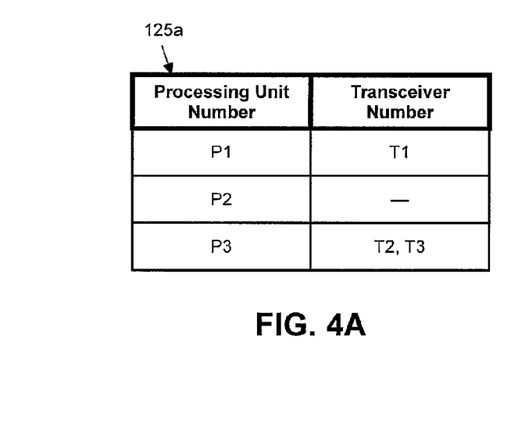
FIG. 4A is a representation of a binding table in a first stage of operation.

With additional reference to FIG. 3A and FIG. 4A, an example processing queue 126*a* and an example binding table 125*a* are shown respectively. The hardware accelerator 124 may create respective entries in the processing queue 126*a* for each of the received packets A1, A2, B1, C1, and C2. The media access controller 110 may perform a lookup in the association table 112 to determine which respective transceivers 106 the clients 130 are associated with, and the hardware accelerator 124 may update the entries 134*a* in the processing queue 126*a* to include information 136*a* that indicates the respective transceivers 106 the packets are associated with. As seen in FIG. 3A, the processing queue may also include a work entry 135*a* for an event associated with transceiver T3, e.g., configuring transceiver T3.

The scheduler 128 may then assign the packets to a processing unit 118 for processing and update the respective entries in the processing queue to include information 138*a* that indicates the processing unit 118 the packet is assigned to. Since packet A1 is at the front of the processing queue 126*a*, in this example, the scheduler 128 determines if transceiver 106*a* (T1) is bound to a processing unit 118 by consulting the binding table. Since transceiver 106*a* (T1) is not yet bound to a processing unit 118, in this example, the scheduler 128 may bind transceiver T1 to processing unit 118*a* as shown by way of example in the binding table 125*a* of FIG. 4A, and assign packet A1 to processing unit 118*a* for processing as shown by way of example in the processing queue 126*a* of FIG. 3A. Accordingly, processing unit 118*a* (P1) will process packets associated with transceiver 106*a* (T1) while transceiver T1 is bound to processing unit P1. The scheduler 128 may update the work entry in the processing queue 126*a* with information 138*a* that indicates which processing unit 118 a packet is assigned to for processing.

The scheduler 128 may then assign other packets to processing units 118 in a similar fashion. The next work entry in the processing queue 126*a*, in this example, is packet A2. As indicated in the processing queue 126*a*, packet A2 is also associated with transceiver 106*a* (T1), and the scheduler 128 may determine that transceiver T1 is currently bound to processing unit 118*a* (P1) by performing a lookup in the binding table 125*a*. Accordingly, the scheduler 128 may assign packet A2 to processing unit 118*a* (P1) as well as shown by way of example in the processing queue 126*a* of FIG. 3A. Packet B1 is likewise associated with transceiver 106*a* (T1), and the scheduler 128 may also assign packet B1 to processing unit 118*a* (P1) after performing a lookup in the binding table 136*a* and determining that transceiver T1 is bound to processing unit P1. Packet C1, in this example, is associated with transceiver 106*b* (T2). Accordingly, the scheduler 128 may determine that transceiver 106*b* (T2) is not bound to a particular processing unit 118 after performing a lookup in the binding table 125*a*. The scheduler 128 may bind transceiver 106*b* (T2) to an idle processing unit 118, e.g., processing unit 118*c* (P3) as shown by way of example in the binding table 125*a* of FIG. 4A. The scheduler 128 may then assign packet C1 to processing unit 118*c* (P3) as shown by way of example in the processing queue 126*a* of FIG. 3A. Packet C2 is destined for the same endpoint as packet C1, i.e., client 130*c*, and is thus also associated with transceiver 106*b* (T2) as seen in the example processing queue 126*a* of FIG. 3A. As a result, the scheduler 128 may determine that transceiver 106*b* (T2) is bound to processing unit 118*c* (P3) and assign packet C2 to processing unit P3 as a result.

Regarding the processing queue work entry for transceiver T3, the scheduler may bind transceiver T3 to an idle processing unit, e.g., processing unit 118*d* (P4), or a processing unit already performing work, e.g., processing unit 118*c* (P3) as shown by way of example in the binding table 125*a* of FIG. 4A.

Once a processing unit 118 has performed the work for a work entry, e.g., processing a packet, the scheduler 128 may remove the processing queue work entry from the processing queue 126. As mentioned above, the system 100, in this example, does not unbind a transceiver 106 from a processing unit 118 until the processing queue 126 contains no work entries associated with that transceiver. Accordingly when the scheduler 128 removes a work entry 134 associated with a transceiver, the scheduler, in this example, may then determine if the processing queue 126 contains any remaining work entries associated with the transceiver 106. For example, after the system 100 processes packet A1, the processing queue 126 still contains entries 134*a* respectively corresponding to packet A2 and packet B1, which are each associated with transceiver 106*a* (T1). As a result, the scheduler 128 will not yet unbind transceiver 106*a* (T1) from processing unit 118*a* (P1). After the system 100 processes packet B1, the processing queue 126, in this example, only contains entries 134*a* corresponding to packets C1 and C2, which are associated with transceiver T2. Because the processing queue 126*a* does not contain any more entries associated with transceiver T1, in this example, the hardware accelerator 124 may unbind transceiver 106*a* (T1) from processing unit 118*a* (P1).

Figure 3B:
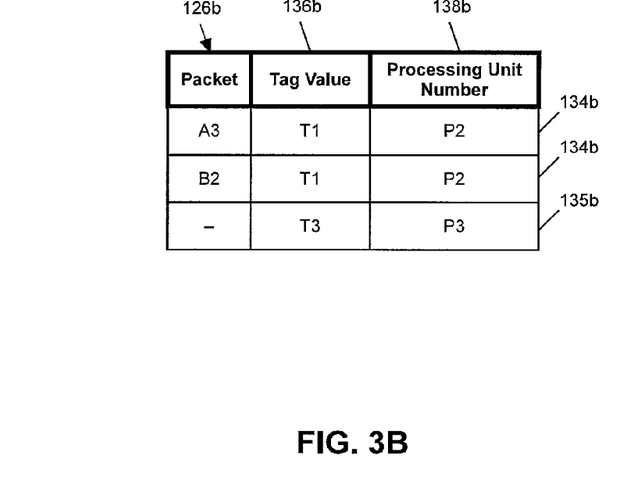
FIG. 3B is a representation of the processing queue of FIG. 3A in a second stage of operation.
Figure 4B:
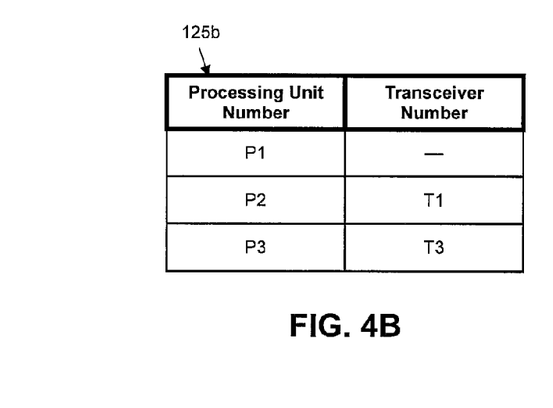
FIG. 4B is a representation of the binding table of FIG. 4A in a second stage of operation.

As shown in FIG. 2, the system 100 may receive packets A3 and B2 some time after receipt and processing of packets A1, A2, B1, C1, and C2 as indicated by the bulleted lines 132. With additional reference to FIG. 3B and FIG. 4B, an updated processing queue 126*b* and an updated binding table 125*b* are respectively shown. As seen in FIG. 4B, the processing queue 126*b* still includes a work entry 135*b* showing the binding of transceiver 106*c* (T3) to processing unit 118*b* (P2) indicating, in this example, that processing unit P2 is still performing work for transceiver T3. The hardware accelerator 124 may tag packets A3 and B2, and the scheduler 128 may create respective work entries 134*b* in the processing queue 126*b* for packets A3 and B2 as discussed above. The processing queue entries 134*b* may likewise include information 136*b* indicating which transceivers the packets are associated with, e.g., the transceiver number, and information 138*b* indicating which processing unit 118 the transceivers are assigned to.

In this example, each of the processing units 118*a*, 118*b*, 118*c*, and 118*d* (P1, P2, P3, and P4) may be idle and available to process packets A3 and B2. Accordingly, the scheduler 128 may bind transceiver 106*a* (T1) to one of the available processing units 118, e.g., processing unit 118*b* (P2) as shown by way of example in the binding table 125*b* of FIG. 4B and assign packets A3 and B2 to processing unit 118*b* (P2) as shown by way of example in the processing queue 126*b* FIG. 3B. Additionally or alternatively, the scheduler 128 may bind a transceiver 106 to a processing unit 118 that is already performing work for another transceiver as discussed above. By dynamically binding transceivers 106 to processing units 118 and dynamically assigning conversational flows to idle processing units in this fashion, the system 100 advantageously maximizes parallel processing of packets while maintaining serialized processing of packets from the same conversational flow. Furthermore, the system 100 may maximize parallel processing of packets from both the wireless interface 104 ("upstream") and from the wired network interface 120 ("downstream"). It will be understood that, typically, the wireless array 102 will process more downstream traffic than upstream traffic.

Figure 5:
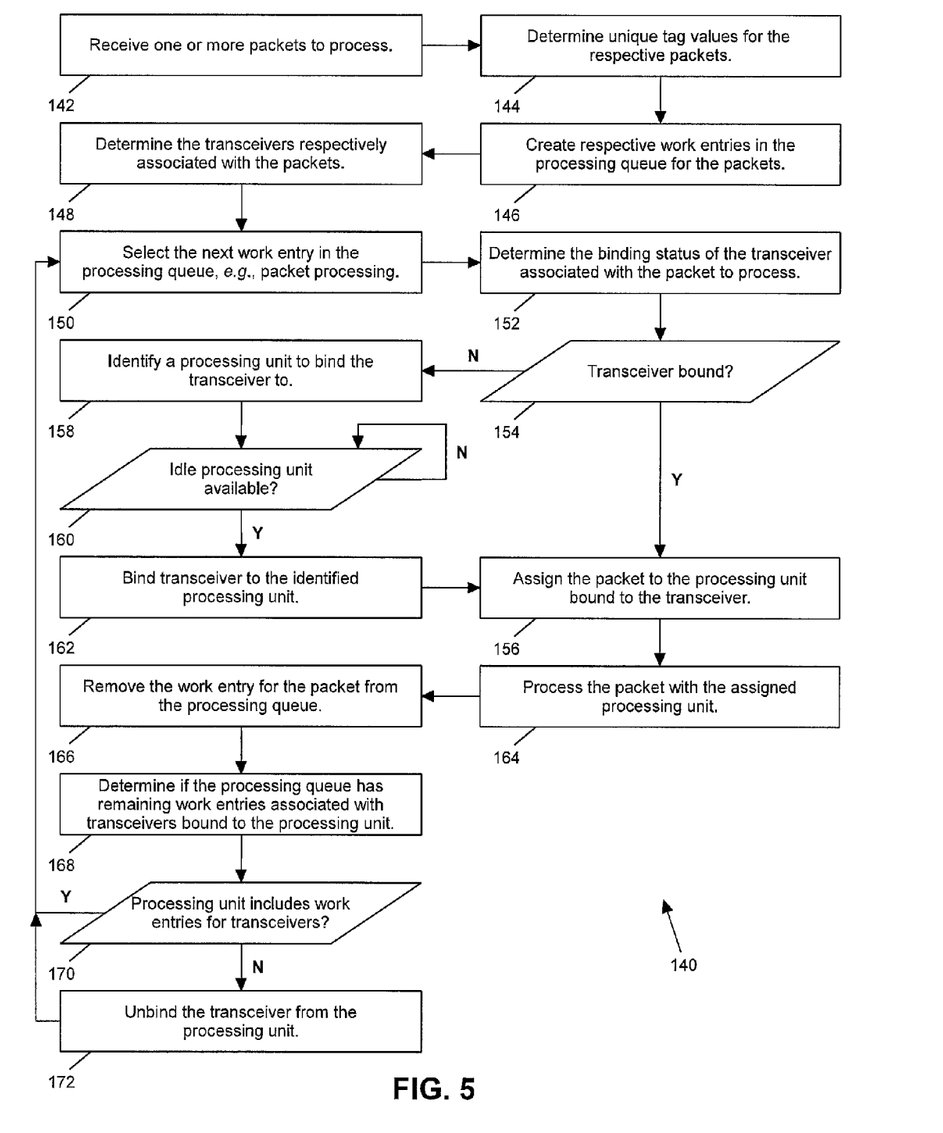
FIG. 5 is a flowchart of example method steps for maximizing parallel processing in a wireless array.

A flowchart 140 of example method steps for maximizing parallel processing in a wireless array 102 is also shown in FIG. 5. As seen in FIG. 5, the system 100 may receive one or more packets to process (step 142). The hardware accelerator 124, in this example, determines a unique tag value for each of the packets based on the transceiver 106 the packet is associated with as discussed above (step 144). The hardware accelerator 124 may then tag packets associated with the same transceiver 106 with the same unique tag value. The scheduler 128, in this example, then creates respective work entries in the processing queue 126 for the packets (step 146). As discussed above, the processing queue may include work entries for other types of work associated with the transceiver, e.g., handling interrupts, configuration, etc. The media access controller 110, in this example, determines which transceivers 106 are respectively associated with the packets (step 148). The scheduler 128 may update the work entries 134 of the processing queue 126 to identify the respective transceivers 106 the packets are associated with.

The scheduler 128, in this example, then selects the work entry 134 at the front of the processing queue 126, e.g., a packet processing work entry (step 150). The hardware accelerator 124, in this example, determines the status of the transceiver 106 associated with the packet to process, i.e., whether the transceiver is bound to a processing unit 118 (step 152). The hardware accelerator 124 may determine the status of the transceiver 106 by, for example, consulting a binding table 125 that includes information indicating transceiver-processing unit bindings. If the transceiver 106 is bound to a processing unit 118, the processing unit processes all packets associated with the transceiver 106 bound to the processing unit. Accordingly, if the hardware accelerator 124 determines the transceiver 106 is bound to a processing unit 118 (step 154), the scheduler 128 assigns the packet to the processing unit bound to the transceiver for processing (step 156). If the hardware accelerator 124 determines the transceiver 106 is not bound to a processing unit 118 (step 154), then the scheduler 128 identifies a processing unit to bind the transceiver to in order to perform the work, e.g., process the packet (step 158). If the scheduler 128, in this example, determines that all processing units 118 are currently bound to other transceivers 106 (step 160), i.e., if an idle processing unit is unavailable, then the scheduler may wait for a processing unit to become available. If the scheduler 128, in this example, determines that a processing unit 118 is available to process the packet (step 160), then the hardware accelerator 124 binds the transceiver 106 to the available processing unit (step 162). As discussed above, however, the scheduler 124 may also bind a transceiver to a processing unit 118 that is already bound to and performing work for another transceiver. The hardware accelerator 124 may bind the transceiver 106 to an available processing unit 118 by, for example, updating the binding table 125 to indicate the transceiver is bound to the processing unit.

Once the scheduler 128 assigns a packet to a processing unit 118, the assigned processing unit may process the packet (step 164). Once a processing unit 118 has performed the work for the work entry, e.g., processed a packet, the scheduler 128 may remove the work entry from the processing queue 126 (step 166). Additionally the scheduler 128 may determine whether the processing queue 126 includes work entries associated with transceivers 106 presently bound to processing units 118 (step 168). As discussed above, the scheduler 128 does not unbind a transceiver 106 from a processing unit 118 if the processing queue 126 includes work entries 134 that are associated with transceivers bound to processing units. In this way, the system 100 ensures the same processing unit 118 processes packets associated with the same transceiver 106. If the processing queue 126 includes work entries associated with bound transceivers 106 (step 170), then the next processing queue entry 134 in the processing queue may be selected for processing (step 150) and steps 152-168 may be repeated. If the processing queue 126 does not include processing queue work entries 134 associated with a bound transceiver 106 (step 170), then the hardware accelerator 124 may unbind the transceiver from the processing unit 118 by, e.g., updating the binding table 125 (step 172). When the transceiver 106 is unbound from a processing unit 118, the transceiver becomes available to be subsequently bound to another processing unit. In this way, the system 100 maximizes parallel processing of packets in a wireless array. It will be understood that additional or alternative components of the system 100 may carry out the example method steps set forth above.

It will also be understood and appreciated that one or more of the processes, sub-processes, and process steps described in connection with FIGS. 1-5 may be performed by hardware, software, or a combination of hardware and software on one or more electronic or digitally-controlled devices. The software may reside in a software memory (not shown) in a suitable electronic processing component or system such as, for example, one or more of the functional systems, devices, components, modules, or sub-modules schematically depicted in FIGS. 1-2. 3A-B, and 4A-B. The software memory may include an ordered listing of executable instructions for implementing logical functions (that is, "logic" that may be implemented in digital form such as digital circuitry or source code, or in analog form such as analog source such as an analog electrical, sound, or video signal). The instructions may be executed within a processing module, which includes, for example, one or more microprocessors, general purpose processors, combinations of processors, digital signal processors (DSPs), field programmable gate arrays (FPGAs), or application-specific integrated circuits (ASICs). Further, the schematic diagrams describe a logical division of functions having physical (hardware and/or software) implementations that are not limited by architecture or the physical layout of the functions. The example systems described in this application may be implemented in a variety of configurations and operate as hardware/software components in a single hardware/software unit, or in separate hardware/software units.

The executable instructions may be implemented as a computer program product having instructions stored therein which, when executed by a processing module of an electronic system (e.g., a system for maximizing parallel processing in a wireless array in FIG. 1), direct the electronic system to carry out the instructions. The computer program product may be selectively embodied in any non-transitory computer-readable storage medium for use by or in connection with an instruction execution system, apparatus, or device, such as a electronic computer-based system, processor-containing system, or other system that may selectively fetch the instructions from the instruction execution system, apparatus, or device and execute the instructions. In the context of this document, computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access, i.e., volatile, memory (electronic); a read-only memory (electronic); an erasable programmable read only memory such as, for example, Flash memory (electronic); a compact disc memory such as, for example, CD-ROM, CD-R, CD-RW (optical); and digital versatile disc memory, i.e., DVD (optical). Note that the non-transitory computer-readable storage medium may even be paper or another suitable medium upon which the program is printed, as the program can be electronically captured via, for instance, optical scanning of the paper or other medium, then compiled, interpreted, or otherwise processed in a suitable manner if necessary, and then stored in a computer memory or machine memory.

It will also be understood that the term "in signal communication" as used in this document means that two or more systems, devices, components, modules, or sub-modules are capable of communicating with each other via signals that travel over some type of signal path. The signals may be communication, power, data, or energy signals, which may communicate information, power, or energy from a first system, device, component, module, or sub-module to a second system, device, component, module, or sub-module along a signal path between the first and second system, device, component, module, or sub-module. The signal paths may include physical, electrical, magnetic, electromagnetic, electrochemical, optical, wired, or wireless connections. The signal paths may also include additional systems, devices, components, modules, or sub-modules between the first and second system, device, component, module, or sub-module.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A method of managing parallel processing of network packets received at a wireless access device that includes a plurality of transceivers and a plurality of processing units, the method comprising:
   determining which transceiver of the plurality of transceivers a received network packet is associated with;
   determining whether the transceiver associated with the received network packet is bound to one of the processing units of the plurality of processing units;
   assigning the received network packet to the processing unit the transceiver is bound to in response to a determination that the transceiver is bound; and
   in response to a determination that the transceiver is not bound, binding the transceiver to a processing unit of the plurality of processing units such that the processing unit processes network packets associated with the transceiver while the transceiver is bound to the processing unit and assigning the received network packet to the processing unit the transceiver is bound to.

2. The method of claim 1 wherein no other processing unit of the plurality of processing units processes received network packets associated with the transceiver while the transceiver is bound to the available processing unit.

3. The method of claim 1 further comprising maintaining a binding table that includes a set of binding entries wherein individual binding entries in the set of binding entries indicate respective bindings between individual transceivers of the plurality of transceivers and individual processing units of the plurality of processing units.

4. The method of claim 3 further comprising updating the binding table to include a new binding entry that indicates a binding between the transceiver associated with the received network packet and the processing unit such that the processing unit becomes a bound processing unit.

5. The method of claim 4 further comprising updating the binding table when the received network packet is processed by the bound processing unit in order to unbind the transceiver associated with the received network packet from the bound processing unit such that the transceiver becomes available to be subsequently bound to another processing unit of the plurality of processing units.

6. The method of claim 3 wherein an event occurring at the wireless access device is associated with one of the transceivers of the plurality of transceivers and further comprising:
updating the binding table to include a new binding entry that indicates a binding between the transceiver associated with the event and one of the processing units in the plurality of processing units such that the processing unit becomes a bound processing unit.

7. The method of claim 6 further comprising updating the binding table when the processing unit bound to the transceiver associated with the event is finished processing a response to the event in order to unbind the transceiver associated with the event from the bound processing unit such that the transceiver associated with the event becomes available to be subsequently bound to another processing unit of the plurality of processing units.

8. The method of claim 6 wherein the event is a received network packet event, a transceiver configuration event, or a transceiver maintenance event.

9. The method of claim 1 further comprising:
maintaining a processing queue that includes a set of work entries wherein individual work entries in the set of work entries are respectively associated with individual events occurring at the wireless access device, the events are respectively associated with individual transceivers of the plurality of transceivers; and
adding a new work entry associated with a new event to the processing queue when the new event occurs such that a response to the new event is processed when the work entry associated with the new event is at the front of the processing queue.

10. The method of claim 9 further comprising removing the new work entry from the processing queue after the response to the new event has been processed.

11. The method of claim 10 further comprising:
identifying one of the transceivers of the plurality of transceivers as a bound transceiver that is bound to one of the processing units of the plurality of processing units;
determining whether the processing queue includes at least one work entry associated with the bound transceiver; and
unbinding the bound transceiver from the processing unit bound to the bound transceiver in response to a determination that the processing queue does not include at least one work entry associated with the bound transceiver.

12. The method of claim 1 further comprising:
determining whether the plurality of processing units includes a processing unit that is available to process the received network packet; and
waiting to bind the transceiver to one of the processing units of the plurality of processing units until one of the processing units becomes available in response to a determination that the plurality of processing units does not include a processing unit that is available to process the received network packet.

13. The method of claim 1 further comprising tagging the received network packet with a unique identifier wherein the unique identifier is based on a tuple of packet data associated with the received network packet.

14. The method of claim 13 wherein the tuple of packet data includes an identifier that indicates which transceiver of the plurality of transceivers the received packet is associated with.

15. The method of claim 14 wherein the identifier is a transceiver number.

16. The method of claim 1 wherein the received network packet is received at a wireless interface that exchanges wireless communications with a client.

17. A system for managing parallel processing of network packets received at a wireless access device that includes a plurality of transceivers and a plurality of processing units, the system comprising:
a media access controller that determines which transceiver of the plurality of transceivers a received network packet is associated with;
a tagging module that determines whether the transceiver associated with the received network packet is bound to one of the processing units of the plurality of processing units;
a scheduler that, in response to a determination that the transceiver associated with the received network packet is bound, assigns the received network packet to the processing unit the transceiver is bound to; and
wherein, in response to a determination that the transceiver is not bound, the tagging module binds the transceiver to a processing unit of the plurality of processing units such that the processing unit processes network packets associated with the transceiver while the transceiver is bound to the processing unit and the scheduler assigns the received network packet to the processing unit the transceiver is bound to.

18. The system of claim 17 wherein the tagging module includes a hardware accelerator that receives the received network packet.

19. The system of claim 18 wherein no other processing unit of the plurality of processing units processes network packets associated with the transceiver while the transceiver is bound to the processing unit.

20. The system of claim 19 wherein the hardware accelerator tags the received network packet with a unique identifier wherein the unique identifier is based on a tuple of packet data associated with the received network packet.

21. The system of claim 20 wherein the tuple of packet data includes an identifier that indicates which transceiver of the plurality of transceivers the received network packet is associated with.

22. The system of claim 21 wherein the identifier is a transceiver number.

23. The system of claim 18 further comprising a binding table that includes a set of binding entries wherein individual binding entries in the set of binding entries indicate respective bindings between individual transceivers of the plurality of transceivers and individual processing units of the plurality of processing units.

24. The system of claim 23 wherein the hardware accelerator updates the binding table to include a new binding entry that indicates a binding between the transceiver associated with the received network packet and the processing unit such that the processing unit becomes a bound processing unit.

25. The system of claim 24 wherein the hardware accelerator updates the binding table when the received network packet is processed by the bound processing unit in order to unbind the transceiver associated with the received network packet from the bound processing unit such that the transceiver becomes available to be subsequently bound to another processing unit of the plurality of processing units.

26. The system of claim 23 wherein:
an event occurring at the wireless access device is associated with one of the transceivers in the plurality of transceivers; and the hardware accelerator updates the binding table to include a new binding entry that indicates a binding between the transceiver associated with the event and one of the processing units in the plurality of processing units such that the processing unit becomes a bound processing unit.

27. The system of claim 26 wherein the hardware accelerator updates the binding table when the processing unit bound to the transceiver associated with the event is finished processing a response to the event in order to unbind the transceiver associated with the event from the bound processing unit such that the transceiver associated with the event becomes available to be subsequently bound to another processing unit of the plurality of processing units.

28. The system of claim 26 wherein the event is a received packet event, a transceiver configuration event, or a transceiver maintenance event.

29. The system of claim 18 further comprising:
a processing queue that includes a set of work entries wherein individual work entries in the set of work entries are respectively associated with individual events occurring at the wireless access device, the event are respectively associated with individual transceivers of the plurality of transceivers; and
wherein the scheduler adds a new work entry associated with the event to the processing queue when the new event occurs such that a response to the new event is processed when the work entry associated with the new event is at the front of the processing queue.

30. The system of claim 29 wherein the scheduler removes the new work entry from the processing queue after the response to the new event has been processed.

31. The system of claim 30 wherein:
the hardware accelerator identifies one of the transceivers of the plurality of transceivers as a bound transceiver that is bound to one of the processing units of the plurality of processing units;
the scheduler determines whether the processing queue includes at least one work entry associated with the bound transceiver; and
the hardware accelerator unbinds the bound transceiver from the processing unit bound to the bound transceiver in response to a determination that the processing queue does not include at least one work entry associated with the bound transceiver.

32. The system of claim 18 wherein the hardware accelerator:
determines whether the plurality of processing units includes a processing unit that is available to process the received network packet; and
waits to bind the transceiver to one of the processing units of the plurality of processing units until one of the processing units becomes available in response to a determination that the plurality of processing units does not include a processing unit that is available to process the received network packet.

33. The system of claim 18 wherein the received network packet is received at a wireless interface that exchanges wireless communications with a client.

34. A method of managing parallel processing of events occurring at a wireless access device that includes a plurality of transceivers and a plurality of processing units, the method comprising:
determining which transceiver of the plurality of transceivers an event occurring at the wireless access device is associated with;
determining whether the transceiver associated with the event is bound to one of the processing units of the plurality of processing units;
assigning the event to the processing unit the transceiver is bound to in response to a determination that the transceiver is bound; and
in response to a determination that the transceiver is not bound, binding the transceiver to a processing unit of the plurality of processing units such that the processing unit processes network packets associated with the transceiver while the transceiver is bound to the processing unit and assigning the event to the processing unit the transceiver is bound to.

35. The method of claim 34 wherein no other processing unit of the plurality of processing units accesses the transceiver associated with the event while the transceiver is bound to the processing unit.

36. The method of claim 35 wherein the event is a received network packet event, a transceiver configuration event, or a transceiver maintenance event.

* * * * *